J. W. STEPHENSON.
RAIL JOINT.
APPLICATION FILED JUNE 7, 1910.

995,196.  Patented June 13, 1911.

WITNESSES
R. A. Balderson
Walter Tamarisz

INVENTOR
J. W. Stephenson
by Bakewell, Byrnes & Parmelee
his Attys

UNITED STATES PATENT OFFICE.

JOHN W. STEPHENSON, OF TOLEDO, OHIO, ASSIGNOR TO THE NATIONAL MALLEABLE CASTINGS COMPANY, OF CLEVELAND, OHIO, A CORPORATION OF OHIO.

RAIL-JOINT.

995,196.      Specification of Letters Patent.    Patented June 13, 1911.

Application filed June 7, 1910. Serial No. 565,608.

*To all whom it may concern:*

Be it known that I, JOHN W. STEPHENSON, of Toledo, Lucas county, State of Ohio, have invented a new and useful Improvement in Rail-Joints, of which the following is a full, clear, and exact description, reference being had to the accompanying drawings, forming part of this specification, in which—

Figure 1:
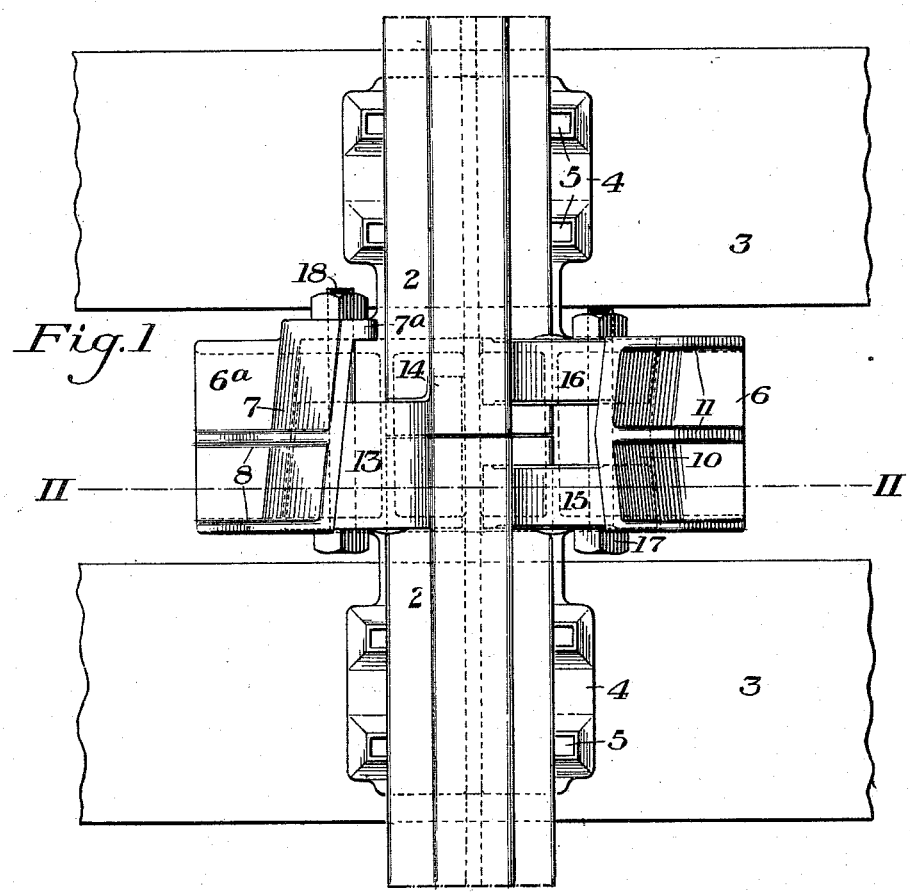
Figure 2:
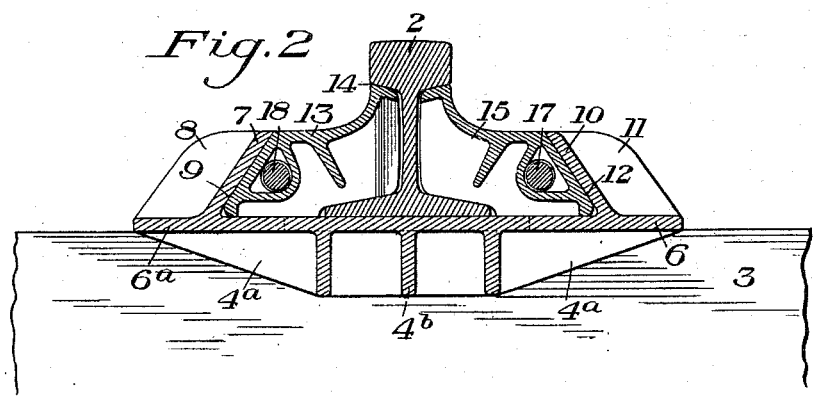

Figure 1 is a plan view of a rail joint embodying my invention; and Fig. 2 is a section on the line II—II of Fig. 1.

My invention has relation to rail joints, and is designed to provide a simple and secure joint which will obviate the use of bolts extending through the webs of the rails and which will not only secure the rails, but will form an efficient support for the heads thereof adjacent to the joint.

Referring to the accompanying drawing, the numeral 2 designates portions of adjacent rails, 3 the usual cross ties, and 4 a joint plate which is of sufficient length to span the space between two of the ties, and which is provided at each end with perforations 5, to receive spikes or other securing means. The central portion of the plate 4 is formed with the lateral extensions 6 and 6ª. The extension 6ª is formed with an upward projection 7, which is reinforced and braced by the webs 8. This projection has an undercut inner face 9, which is also inclined with respect to the rails so as to form a wedging face. The lateral extension 6 at the opposite side is formed with an upward projection 10, reinforced and braced by the webs 11, and which is also undercut. This projection is also inclined in opposite directions from its center, so as to form a double wedging face.

Seated between the face 9 of the projection 7 and the rail is a combined joint and bracing member 13, which is shaped to fit the base of the rail and also to seat upwardly underneath the head thereof, as shown at 14 in Fig. 2, so as to have a supporting engagement with the head of the rail. The upper portion 14, which seats underneath the head of the rail is of sufficient length and breadth to extend across the joint between the rails, as shown in Fig. 1. Seated between the opposite side of the rail and the inner face 12 of the projection 10 are two bracing and joint members 15 and 16, which fit the rail in the manner similar to the member 13. The member 15 is seated between the rail and the undercut wedging face 12 at one side of the joint between the rails, and the member 16 is similarly seated at the opposite side of the joint. These members 15 and 16 are driven to their seats from opposite sides and are then secured by means of a bolt 17, passing through both of them. The member 13 is driven to its seat in a similar manner at the opposite side of the rail, and is secured by a bolt 18, passing therethrough and having a bearing at one end in the end portion 7ª of the projection 7. The bolts 17 and 18 provide means whereby the bracing and joint members may be firmly secured in their driven positions, and also for taking up any looseness which may develop. The members 13, 15 and 16 are shown as of hollow or cored form, in order to lighten them and reduce the amount of metal required, but may be of various forms, either solid or cored.

The end portion 7ª above referred to is in the form of a flange which forms a tie between the projection and the base member. This tie is of great importance since it greatly strengthens the construction by preventing the projection being spread, or bent outwardly, in driving the member 13 to its seat.

The central portion of the base plate 4 between the ties is preferably reinforced by the transverse depending ribs or webs 4ª, and by the longitudinal ribs or webs 4ᵇ, which connect the ribs or webs 4ª.

I claim:

1. In a rail joint, a base member having a rail seating surface, and having an upward projection at each side of such surface, said projection having undercut and longitudinally inclined inner faces one of which is tied at one end at its inner side to said base member, and combined joint and brace members adapted to be driven between said faces and the rails; substantially as described.

2. In a rail joint, a base member having a rail seating surface in substantially the horizontal plane of its upper face, and having an inwardly inclined upwardly extending projection at each side of the rail seating portion, said projections being inclined obliquely to the rails, webs connecting the outer side of said projections with the base member, a tie connecting one of said projections at one end at its inner sides to said base member, and combined joint and brace members arranged to be driven between said inclined faces and the rails; substantially as described.

3. In a rail joint, a base member adapted to span the space between two adjacent cross ties and having means at its ends for securing it to the ties, and also having lateral extensions at its central portion, said extensions having upward projections at opposite sides of the rails, provided with longitudinally inclined and undercut inner faces, and a flange connecting at least one of said projections at one end, at the inner side thereof, with said base member; substantially as described.

4. A rail joint, comprising a base member extending underneath the end portions of the rails and having projections at opposite sides of the rails forming wedging seats, a combined brace and joint member driven between one of said projections and the rails and engaging both rails, and two bracing and joint members driven in opposite directions between the other projection and the rails, each of said brace members bearing against one rail only, together with means for positively securing said members in place and whereby each of said members may be adjusted to take up looseness; substantially as described.

5. A rail joint, comprising a base member adapted to span two ties, and having side extensions to project laterally between the ties, said member having an upward projection at each side of the rail, each of the projections having an inclined and undercut inner face, and a combined bracing and joint member seated between each of said projections and the rails, said members being driven to their seats in opposite longitudinal directions; substantially as described.

In testimony whereof, I have hereunto set my hand.

JOHN W. STEPHENSON.

Witnesses:
MARK KUEHN,
JOHN J. MANNING.

---

Copies of this patent may be obtained for five cents each, by addressing the "Commissioner of Patents, Washington, D. C."